Nov. 8, 1938.    J. D. ALTEMUS ET AL    2,136,035
TRAP MOUNTING
Filed March 26, 1935
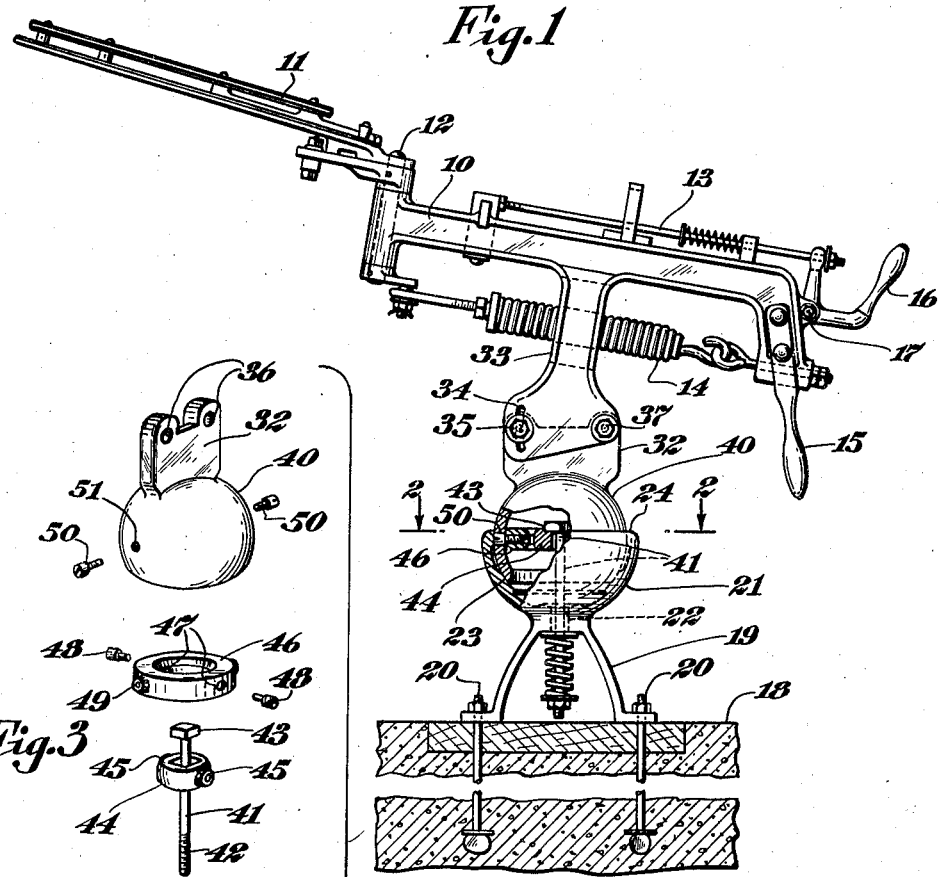
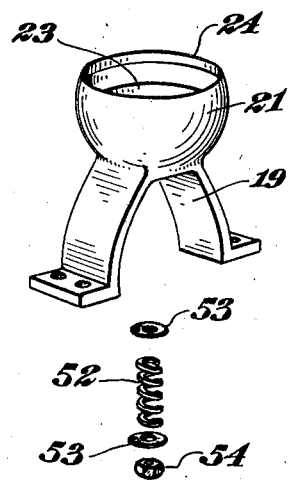
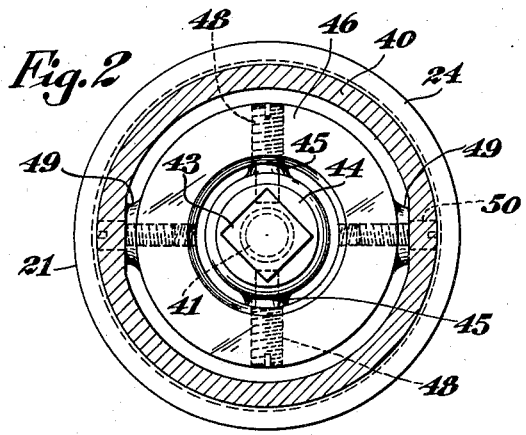
INVENTORS.
James D. Altemus,
Albert W. R. J. Moeller,
BY Frederick Breitenfeld
ATTORNEY.

Patented Nov. 8, 1938

2,136,035

UNITED STATES PATENT OFFICE 2,136,035

TRAP MOUNTING

James D. Altemus, Roslyn, and Albert W. R. J. Moeller, New York, N. Y.; said Moeller assignor to said Altemus Application March 26, 1936, Serial No. 70,934

7 Claims. (Cl. 248—181)

Our present invention relates generally to catapults, and has particular reference to an improved trap for hurling targets into the air.

Our invention is primarily adaptable to traps of the type in which a pivoted throwing arm is carried by a frame which is in turn mounted in pivoted relationship to a base, whereby an operator may load and reload the device and project a series of clay targets or the like into the air. We have chosen to illustrate such a device in the present drawing, but it will be understood that certain phases of our invention are not necessarily restricted in their applicability to any specific type of target thrower.

It is a general object of our invention to provide a trap which is so improved, particularly in connection with the mounting of the trap upon a base, that the operation of the device is greatly simplified, capable of better control, and permitting much greater variety in the angularity of propulsion of a series of projectiles.

We are aware of the fact that traps have been customarily mounted in adjustable relationships to a base, so that a certain degree of variation may be effected with respect to the direction in which targets are projected. The adjustments available are, however, of such a limited character, and usually require such time-consuming manipulations; that where a series of targets are to be propelled in relatively rapid succession, the general direction is usually substantially the same in each case. It frequently happens, therefore, that a person is a good marksman at trap shooting, but is very poor indeed when it comes to shooting birds in the field, because a covey will usually rise from the ground in widely varying directions.

A trap constructed in accordance with our present invention is capable of manipulation by a single operator to project into the air, in relatively rapid succession, a series of targets traveling in widely different directions; and the present type of trap is, therefore, unusually efficient in simulating the conditions which usually confront the hunter in the field.

One of the features of the present construction, contributing to the unusual and novel capabilities of the present trap, lies in the employment of a special adaptation of a gimbal joint for articulating the trap proper to a base. An ordinary ball-and-socket joint is unsuitable and not sufficiently staunch to withstand the lateral and angular "kick-backs" which occur when a target trap is operated.

We achieve the foregoing objects, and such other objects as may hereinafter appear or be pointed out, in the manner illustratively exemplified in the accompanying drawing, wherein—

Figure 1 is a side elevational view of a trap constructed in accordance with the present invention;

Figure 2 is an enlarged cross-sectional view taken substantially along the line 2—2 of Figure 1; and Figure 3 is an exploded view showing the elements of the present trap mounting.

The trap proper may be of any customary character, and the details of it form no part of the present invention. Accordingly, they will be but briefly referred to. We have shown a frame 10 to which a throwing arm 11 is pivoted, as at 12, the reference numeral 13 being applied to a releasing mechanism. As will be understood by those skilled in the art, the trap is loaded by swinging the arm 11 rearwardly into a latched position, during which time the spring 14 is stressed. After the targets have been applied in desired position onto the arm 11, and after the trap is properly aimed, the manipulation of the releasing mechanism 13 causes the throwing arm 11 to swing forwardly into the position shown in Figure 1, under the action of the spring 14, whereby the target or targets are propelled into the air.

In accordance with our present invention, a handle 15 is rigidly secured to the rear end of the frame 10, and a second handle 16 is pivoted to the frame, as at 17, and serves as a trigger for the releasing mechanism 13. Both of these handles are arranged in substantially vertical positions, as shown in Figure 1, so that they may be grasped by the hands of an operator. The handle 15 fulfills an aiming function, and is manipulated very much like a pistol grip in swinging the forward end of the trap in a desired direction. Pulling rearwardly upon the trigger handle 16 effects an operation of the releasing mechanism.

The principal feature of our invention resides in the novel means for mounting the trap upon a base. At 18 we have shown a typical foundation of concrete or the like upon which a hollow base 19 is rigidly mounted by means of bolts or studs 20 or the like. The lower portion of the base may be of any desired shape and is preferably somewhat dome-shaped. The upper portion of the base (designated by the reference numeral 21) is cup-shaped and defines an upwardly-open socket. There is an opening 22 in the bottom of the socket which establishes communication with the interior of the lower portion of the base 19.

The socket 21 has a number of inner surface portions 23 which conform to the surface of a sphere, but the socket 21 is essentially different from the ordinary socket of a ball-and-socket joint in that the largest diameter of the present socket is at its rim 24.

A trap-supporting member, shown in the upper portion of Figure 3, consists of an element having an upper web portion 32 and a lower, hollow, downwardly-opening, spherical member 40. Preferably, though not necessarily, the frame 10 of the trap has a depending foot 33 which is adjustably secured to the web 32. For example, we have illustratively shown a slot 34 in the foot 33, adapted to engage with a nut-and-bolt type of clamp 35 which extends through one of the openings 36 in the web 32. A nut-and-bolt type of clamp 37 extends through the other opening 36 and through a corresponding opening in the foot 33. In Figure 1, we have illustratively shown the clamp 35 positioned about midway of the slot 34, this bringing the frame 10 to approximately the angle shown. If the angle is to be smaller, with reference to the horizontal, the slot 34 may be pushed downwards; or, if the angle is to be increased relative to the horizontal, the slot 34 is pushed upwards.

The spherical member 40 is adapted to fit into the socket 21, the outer spherical surface of the member 40 having the same curvature as the portions 23 of the socket 21. The association is, however, radically different from a conventional or ordinary type of ball-and-socket joint.

Extending axially through the opening 22 in the base is a rod 41 preferably threaded at its lower end 42 and having a squared head 43. The lower portion of the rod extends down into the lower portion of the base 19 and is housed by the latter. The upper end of the rod 41 projects into the interior of the spherical member 40. In accordance with our invention, a gimbal joint articulates the upper end of the rod 41 with the spherical member 40.

One manner in which this may be economically and efficiently accomplished is illustrated most clearly in Figure 3. A ring-shaped element 44 fits over the rod 41 and has a square recess which snugly accommodates the squared head 43 of the rod. At diametrically opposed points, journal bearings 45 are provided. The element 44 thus, in effect, forms a rigid part of the head of the rod 41. Surrounding the element 44 is a ring 46 having the diametrically opposed, aligned, threaded openings 47. Studs 48, threaded at the outer end, engage within the openings 47, and the inner ends of the studs serve as journals and fit into the bearings 45. This pivots the ring 46 to the head of the rod 41 along a diameter of the ring 46.

At opposite ends of a diameter at right angles to the last-mentioned diameter, the ring 46 is provided with interiorly threaded bosses 49 into which studs 50 fit. The studs 50 are threaded at their inner ends, and their outer ends thus serve as pivots or journals which engage within openings 51 in the spherical member 40. This serves to pivot the ring 46 to the spherical member 40 along a diameter at right angles to the diameter along which the ring 46 is pivoted to the element 44.

The structure is completed by providing a means beneath the socket 21 which exerts a constant downward pull on the rod 41. A preferred way of accomplishing this is to mount a compression spring 52 around the lower portion of the rod 41, and to hold the same in position, between washers 53, by means of a nut 54 which engages with the threads 42. The spring 52 exerts a constant yieldable downward pull upon the rod 41, and hence upon the spherical member 40, this pull being always in an axial direction with respect to the base. The tension of the spring may be adjusted by means of the nut 54. The ultimate result is that the trap proper may be swung into a wide variety of positions without impairing the staunch and rugged manner with which the trap is supported upon the base.

The trap is operated as follows. The adjustments with respect to the clamps 35 and 37 are first made to suit the particular purpose for which the trap is to be used. These adjustments, once made, are not varied during the operation of the trap. The operator of the trap then positions himself behind it so that he can conveniently grasp the handle 15 with one hand and the handle 16 with the other. First he swings the arm 11 rearwardly and loads it; and he may then aim the trap to any of a large variety of directions, as will be readily understood by anyone familiar with the freedom of movement of a gimbal-joint articulation. The pressure of the spring 52, thereby pressing the outer surface of the member 40 against the spherical surfaces 23 of the socket 21, impedes the freedom of movement of the trap to an extent which is just sufficient to keep the trap under the complete control of the operator. The pressure is not so great, however, that the operator may not, with considerable ease, tilt the trap rapidly from one angular position to another. Whenever the operator feels that the trap is aimed to suit his purposes, he merely pulls the handle 16 and the target or targets are thereupon propelled into the direction desired at the desired inclination to the horizontal.

The unusual and outstanding advantage of the present trap, as compared with any ordinary trap, is that the operator can almost immediately reload the trap and fire a target into an entirely different direction. No cumbersome manipulations are necessary. The axial disposition of the rod 41 permits him at once to swing the entire trap around a vertical axis, and the handle 15 is constantly under his control so as to permit him at the same time to tilt the trap into any of a large variety of positions. In this way, the targets that are propelled may be caused to simulate, quite closely, the birds which would rise from cover in the field.

In general, it will be understood that changes in the details, herein described and illustrated for the purpose of explaining the nature of our invention, may be made by those skilled in the art without departing from the spirit and scope of the invention as expressed in the appended claims. It is, therefore, intended that these details be interpreted as illustrative and not in a limiting sense.

Having thus described our invention, and illustrated its use, what we claim as new and desire to secure by Letters Patent is—

1. A trap mounting comprising an upwardly-open socket having a bottom opening, said socket having inner surface portions conforming to the surface of a sphere, a trap-supporting member having a hollow, downwardly-opening, spherical member adapted to fit into said socket, a rod projecting axially through said opening into the interior of said spherical member, a gimbal joint articulating the spherical member to the top of said rod, and yieldable means beneath said socket exerting a constant downward pull on said rod.

2. A trap mounting comprising an upwardly-open socket having a bottom opening, said socket having inner surface portions conforming to the surface of a sphere, a trap-supporting member having a hollow, downwardly-opening, spherical member adapted to fit into said socket, a rod projecting axially through said opening into the interior of said spherical member, a gimbal joint articulating the spherical member to the top of said rod, and yieldable means beneath said socket exerting a constant downward pull on said rod, said means comprising a compression spring operatively interposed between the socket and the rod.

3. A trap mounting comprising an upwardly-open socket having a bottom opening, said socket having inner surface portions conforming to the surface of a sphere, a trap-supporting member having a hollow, downwardly-opening, spherical member adapted to fit into said socket, a rod projecting axially through said opening into the interior of said spherical member, a gimbal joint articulating the spherical member to the top of said rod, a spring operatively interposed between the socket and the rod for exerting a constant yieldable downward pull on said rod, and means for adjusting the tension of said spring.

4. A trap mounting comprising an upwardly-open socket having a bottom opening, said socket having inner surface portions conforming to the surface of a sphere, a trap-supporting member having a hollow, downwardly-opening, spherical member adapted to fit into said socket, a rod projecting axially through said opening into the interior of said spherical member, a gimbal joint articulating the spherical member to the top of said rod, yieldable means beneath said socket exerting a constant downward pull on said rod, and a hollow base beneath said socket for housing the lower portion of said rod.

5. A trap mounting comprising an upwardly-open socket having a bottom opening, said socket having inner surface portions conforming to the surface of a sphere, a trap-supporting member having a hollow, downwardly-opening, spherical member adapted to fit into said socket, a rod projecting axially through said opening into the interior of said spherical member, a gimbal joint articulating the spherical member to the top of said rod, a spring operatively interposed between the socket and the rod for exerting a constant yieldable downward pull on said rod, means for adjusting the tension of said spring, and a hollow base beneath said socket for housing the lower portion of said rod.

6. A trap mounting comprising an upwardly-open socket having a bottom opening, said socket having inner surface portions conforming to the surface of a sphere, a trap-supporting member having a hollow, downwardly-opening, spherical member adapted to fit into said socket, a rod projecting axially through said opening into the interior of said spherical member, a gimbal joint articulating the spherical member to the top of said rod, and yieldable means beneath said socket exerting a constant downward pull on said rod; the largest diameter of said socket being at its rim.

7. A trap mounting comprising an upwardly-open socket having a bottom opening, said socket having inner surface portions conforming to the surface of a sphere, a trap-supporting member having a hollow, downwardly-opening, spherical member adapted to fit into said socket, a rod projecting axially through said opening into the interior of said spherical member, a gimbal joint articulating the spherical member to the top of said rod, and yieldable means beneath said socket exerting a constant downward pull on said rod, said gimbal joint comprising a head on the upper end of said rod, a ring surrounding said head and pivoted to the latter along a diameter of said ring, and means for pivoting said ring to the spherical member along a diameter at right angles to the first-named diameter.

JAMES D. ALTEMUS.
ALBERT W. R. J. MOELLER.